US006209012B1

(12) United States Patent
Baudendistel

(10) Patent No.: US 6,209,012 B1
(45) Date of Patent: Mar. 27, 2001

(54) SYSTEM AND METHOD USING MODE BITS TO SUPPORT MULTIPLE CODING STANDARDS

(75) Inventor: Kurt Baudendistel, St. Louis, MO (US)

(73) Assignee: Lucent Technologies Inc., Murray Hill, NY (US)

( * ) Notice: Subject to any disclaimer, the term of this patent is extended or adjusted under 35 U.S.C. 154(b) by 0 days.

(21) Appl. No.: 09/146,324

(22) Filed: Sep. 2, 1998

(51) Int. Cl.[7] ........................................................ G06F 7/00
(52) U.S. Cl. ................................................................. 708/209
(58) Field of Search .................................... 708/209, 212

(56) References Cited

U.S. PATENT DOCUMENTS

| | | | | |
|---|---|---|---|---|
| 5,073,864 | * | 12/1991 | Methvin et al. ........................ | 708/212 |
| 5,327,543 | * | 7/1994 | Miura et al. ............................ | 708/209 |
| 5,513,181 | | 4/1996 | Bresalier et al. ........................ | 370/79 |
| 5,598,362 | * | 1/1997 | Adelman et al. ....................... | 708/603 |
| 5,896,305 | * | 4/1999 | Bosshart et al. ........................ | 708/209 |
| 5,978,822 | * | 11/1999 | Muwafi et al. ......................... | 708/209 |
| 5,991,786 | * | 11/1999 | Mahurin .................................. | 708/209 |
| 6,009,451 | * | 12/1999 | Burns ...................................... | 708/209 |

FOREIGN PATENT DOCUMENTS 0 718 757 A2    6/1996    (EP) ................................. G06F/9/302

OTHER PUBLICATIONS

Nurmi, J. et al., "A DSP core for speech coding applications" Proceedings of the IEEE International Conference on Acoustics, Speech and Signal processing (ICASSP), vol. 2, 19–22, Apr. 22, 1994, pp. 11–429 to 11–432.

* cited by examiner

Primary Examiner—Tan V. Mai
(74) Attorney, Agent, or Firm—Darby & Darby

(57) ABSTRACT

Using mode bits, multiple coding standards are supported by a single digital signal processor. The mode bits specify which coding standard is implemented so that the system will perform the correct data manipulation operations for that coding standard. Mode bits are provided for shift fifteen bits operations and shift-and-round operations.

28 Claims, 3 Drawing Sheets

SYSTEM AND METHOD USING MODE BITS TO SUPPORT MULTIPLE CODING STANDARDS

FIELD OF THE INVENTION

The present invention relates to a system and method for speech and audio coding and, more particularly, to a system and method that uses mode bits to specify which coding standard is implemented so that the system will perform the correct data manipulation operations for that coding standard.

BACKGROUND OF THE INVENTION

Mobile communications devices such as cellular telephones communicate with telephones and computer systems using analog or digital signals at various stages of the signal transmission path. The conversion of the analog signals to the digital signals, and vice versa, is accomplished using analog-to-digital and digital-to-analog converters. The compression of speech signals is accomplished using one of several speech (and audio) coding standards.

Some of the more important coding standards include the North American cellular standards (e.g., IS54), the ITU-T standards G.723, G.728 and G.729, and the European cellular standards (GSM-EFR, GSM-FR and GSM-HR). The speech processing specifications of GSM are described, for example, in the *GSM 6.01–6.32 Recommendation Specification* document or in the book by Michel Mouly and Marie-Bernadette Pauter entitled *The GSM System for Mobile, Communications,* Palaiseau, France, ISBN 2-9507190-0-7.

Typically, these coding standards include various algorithm specifications that define how data must be manipulated so that the data conforms to the coding standard. For example, GSM is specified in a bit-exact standard that defines in detail all arithmetic operations and their required accuracy. Thus, each implementation that follows the standard will produce the same output for a given input sequence. By providing a collection of test vectors as part of the standard, compliance with GSM is easily verified.

As a result of strict specifications such as this, a given data operation may need to be implemented differently depending on the standard being applied. For example, a multiple-precision multiply operation that shifts the bits in a data word fifteen bits to the right is specified as a shift right fifteen bits operation in GSM-HR, but is specified as a shift right sixteen bits and a shift left one bit operation in GSM-EFR.

Conventionally, coding processing systems are implemented and configured for a single coding standard. That is, a given system cannot be dynamically switched between different coding standards. Thus, to provide the appropriate decoding for different coding standards, more than one coding system is required. This can significantly increase the cost to a user should he or she need to upgrade his or her system to support a different coding standard.

Thus, a need exists for a coding processing system that can conveniently and economically process signals defined according to a variety of coding formats.

SUMMARY OF THE INVENTION

Mode bits incorporated into a digital signal processor define the implementation of various data operations associated with coding standards. The digital signal processor can be reconfigured to accommodate a different coding standard simply by changing the setting of the mode bit.

In one embodiment, a shift fifteen mode bit defines whether the system performs a conventional shift right fifteen bits operation or whether it performs a shift right sixteen bits and a shift left one bit operation. By using the mode bit to specify the coding standard, the system can use a common shift fifteen instruction for both GSM-HR and GSM-EFR coding standards.

In another embodiment, a mode bit supports a shift-and-round operation. This mode bit defines whether to route the most significant bit shifted out of a data word to the carry bit of an adder in the next stage of the processing chain.

BRIEF DESCRIPTION OF THE DRAWINGS

These and other features of the invention will become apparent from the following detailed description of the preferred embodiments and the claims, when taken with the accompanying drawings, wherein similar reference characters refer to similar elements throughout and in which:

DESCRIPTION OF PREFERRED EMBODIMENTS

A digital signal processor (DSP) is a special-purpose CPU utilized for digital processing and analysis of signals from analog sources, such as sound. The analog signals are converted into digital data and analyzed using various algorithms, such as Fast Fourier Transforms. DSPs are designed for particularly fast performance of certain operations (such as multiplication, multiplying and accumulating, and shifting and accumulating) because the math-intensive processing applications for DSPs rely heavily on such operations. For this reason, a DSP will typically include special hardware circuits to perform multiplication, accumulation and shifting operations.

One popular form of DSP architecture is known as a Multiply-Accumulate or MAC processor. The MAC processor implements an architecture that takes advantage of the fact that the most common data processing operations involve multiplying two values, then adding the resulting value to another and accumulating the result. These basic operations are efficiently carried out utilizing specially configured, high-speed multipliers and accumulators, hence the "Multiply-Accumulate" nomenclature. In order to increase the processing power of MAC processors, they have been designed to perform different processes concurrently. Towards this end, DSP architectures with plural MAC structures have been developed. For example, a dual MAC processor is capable of performing two independent MAC operations concurrently.

Figure 1:
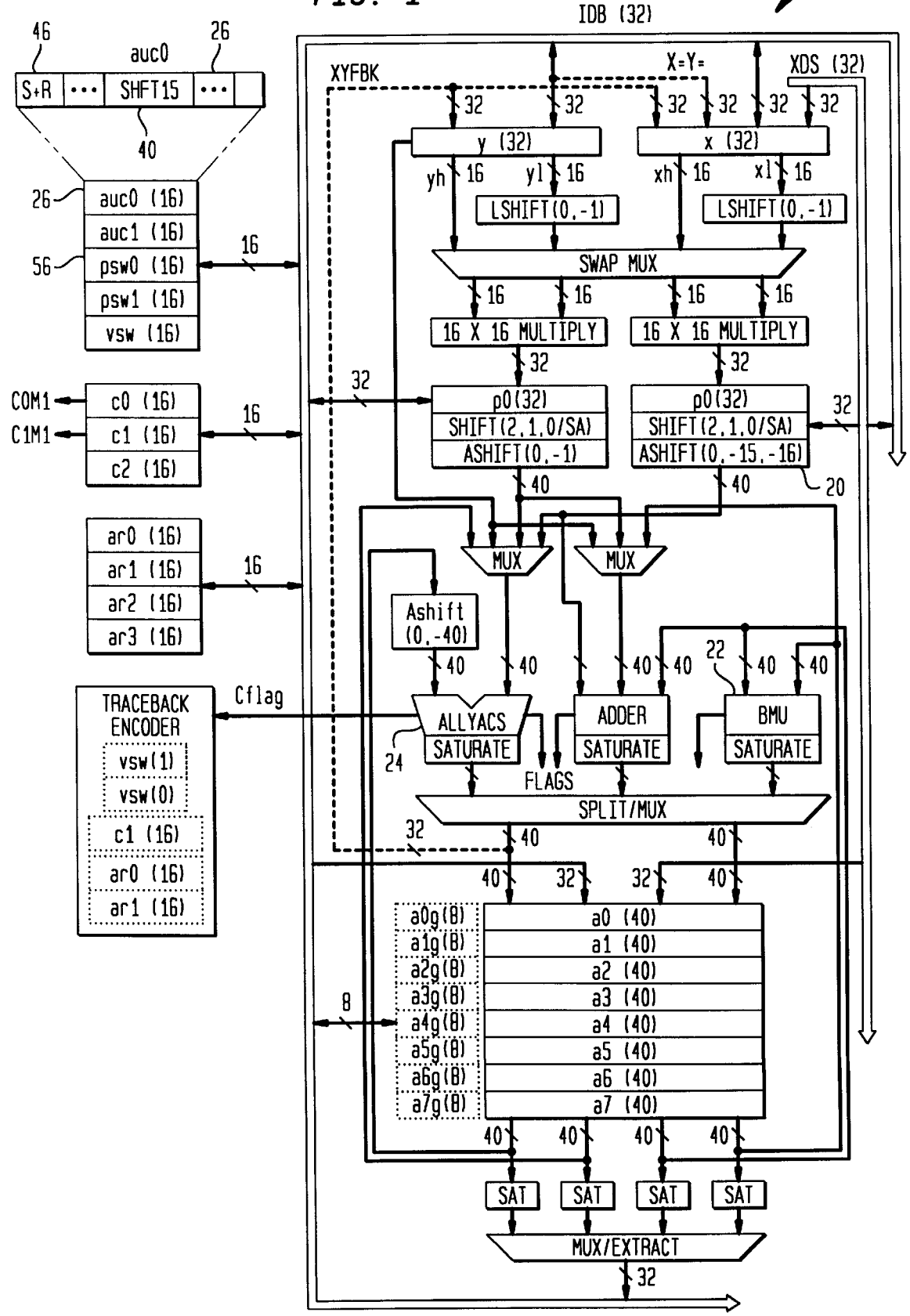
FIG. 1 is a block diagram illustrating one embodiment of a data arithmetic unit incorporating the present invention.

FIG. 1 illustrates a data arithmetic unit ("DAU") D of a digital signal processor (not shown).

Referring now to FIG. 1, the present invention may be implemented in a wide range of digital signal processing applications. Preferably the invention is incorporated in a data arithmetic unit ("DAU"), D, for use in a dual-MAC processor.

The DAU includes dual 32-bit registers x(32) and y(32) that are operated as four 16-bit registers yh, yl, xh and xl when used providing the inputs to two signed 16-bit×16-bit multipliers M1 and M2. The respective multipliers produce respective 32-bit results stored into respective product registers p0(32) and p1(32). The product registers communicate with a 32-bit data bus IDB(32) that serves as the primary data path for the data arithmetic unit.

The data stored in the respective product registers p0(32) and p1(32) may undergo arithmetic register shifts and are fed through multiplexers MUX to either a 40-bit arithmetic-logic-unit ALU with an add/compare/select feature ACS, a 40-bit manipulation unit BMU, or a 40-bit 3-input adder/subtractor ADDER. The arithmetic-logic-unit implements addition, subtraction, and various logical operations. The bit manipulation unit implements barrel-shifts, bit insertion and extraction, and normalization. As a complement to the arithmetic and bit manipulation units, the adder performs general addition and subtraction operations. Concurrent multiply and accumulation operations may be achieved by using the multipliers, the ALU and the ADDER.

Respective saturator units disposed at the outputs of the respective arithmetic, bit manipulation and adder units ALU, BMU and ADDER enable overflow saturation to modify the respective results. The overflow saturation feature also optionally affects accumulator values as the data is transferred to memory or to one or more registers. This feature accommodates various speech coding standards such as Global System Modulation, or GSM, vocoders at full, half and enhanced full rates. Moreover, shifting in the arithmetic pipeline occurs at several stages to accommodate various standards for extended-precision multiplications.

The modified results from the respective saturators are then fed through a split multiplexer SPLITMUX to a register array comprising eight 40-bit accumulators a0 through a7. Each of the respective accumulator pairs includes respective high and low parts.

The data arithmetic unit DAU also conveniently includes a plurality of 16-bit, bus-accessible control registers including counters c0–c2, arithmetic unit control registers auc0 and auc1, processor status words psw0 and pws1, auxiliary registers ar0–ar3, and a Viterbi support word vsw.

Of primary importance here, the DAU D includes a shifter 20 for performing a shift right fifteen bit operation, a bit manipulation unit ("BMU") 22, and arithmetic logic unit ("ALU") 24 and a mode bit register auc0 26.

Figure 2A:
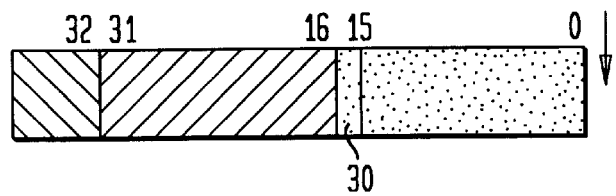
FIGS. 2A–2C are a graphical representation of shift fifteen bits operations as treated herein.
Figure 2B:
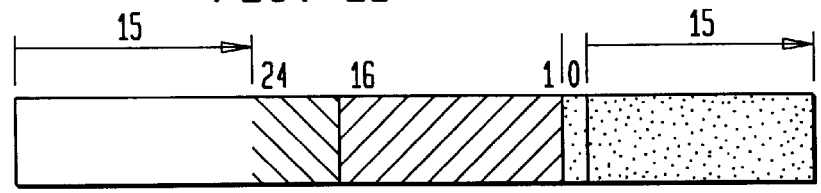
Figure 2C:
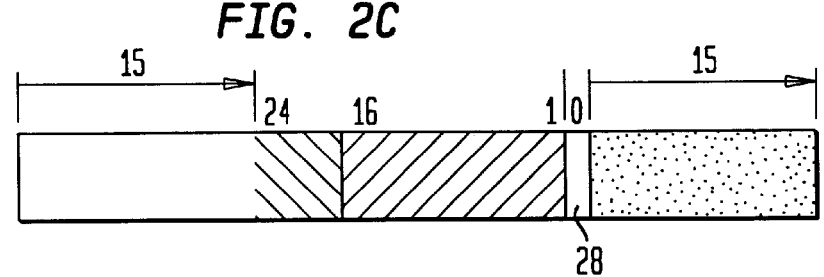
Figure 3:
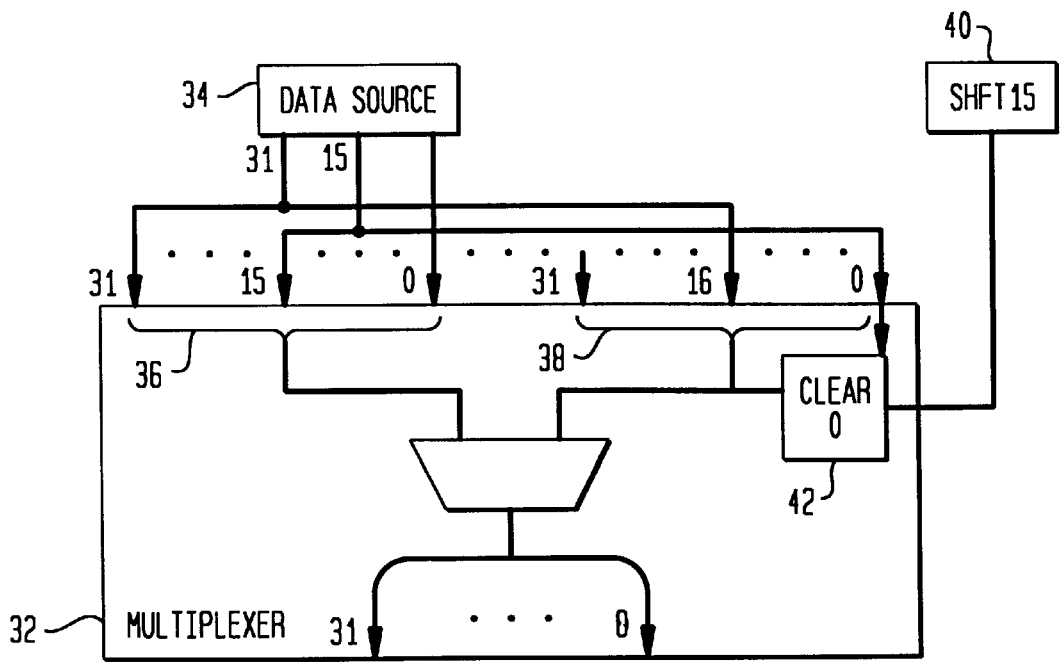
FIG. 3 is a block diagram illustrating one embodiment of a data shifter used to implement the shift fifteen bits operation of the present invention.

The shift fifteen operation is described in detail in FIGS. 2–3. The representations designated A, B and C in FIG. 2 represent the state of a data word and associated data bits before and after bit shift operations. The numbers above the data words represent bit positions. For example, in A bits 0–15 are represented by the speckled portion of the data word. A 32 bit word designated in A by bits 0–31 is right shifted by fifteen bits (as represented by the arrows in B and C) by two alternate methods, the two results being herein designated B and C. The shift operation described in B is a standard shift (commonly designated: >>15). The shift operation described in C is a shift right sixteen and shift left one bit operation (typically designated: >>16<<1). This operation leaves bit 0 of the shifted data (28) cleared, regardless of the value of bit 15 (30) in A. In contrast, B illustrates that after the shift bit 0 (28) is unchanged from bit 15 (30) in A.

FIG. 3 depicts one embodiment of the shift fifteen circuit. A multiplexer 32 (one of the multiplexers MUX shown below product registers p0, p1 in FIG. 1) selects either the unshifted data 36 from a data source 34 or the bits from the data source 34 that correspond to a shift of fifteen bits to the right 38. In FIG. 1, this would be achieved by controlling the shifting of the outputs of p0, p1. For the implementation of the shift operation as depicted in FIG. 3, bit 15 from the data source is connected to input bit 0 of the bits 38. To reduce the complexity of FIG. 3, only a few representative connections are illustrated.

A shift fifteen (SHFT15) mode bit 40 controls whether the shift is a >>15 or a >>16<<1 operation. If the SHFT15 mode bit 40 in the auc0 register 26 (FIG. 1) is not set, bit 0 of the shifted data passes through the multiplexer 32 unchanged. If the SHFT15 mode bit 40 in the auc0 register 26 is set, bit 0 of the shifted data is cleared by the circuit 42 when it is passes through the multiplexer.

In an alternative embodiment the actual shift operations specified may be performed (e.g., the data word is actually shifted). However, the embodiment of FIG. 3 offers data throughput performance advantages that are important in high speed DSP applications.

Programming examples of multiple-precision multiplies incorporating the SHFT15 mode bit follow.

The first example shows a 16×31 multiply using GSM-HR:

$$auc0 = AUC\_DEFAULT \quad\quad /* \; SHFT15 = 0 */$$
$$a0 = 0 \quad p0 = 0 \quad\quad p1 = 0 \quad\quad y = *r0++ \quad xh = *pt0++$$
$$p0 = xh*yh \quad p1 = xh*yl$$
$$a0 = a0 + p0 + p1 >> 15$$

In the first line, the SHFT15 mode bit 40 is maintained at its default value (0 or cleared). In the second line, the product registers p0, p1 and the accumulator a0 are reset, and the y and xh registers are loaded via a pointer. In the third line, the products of xh with the two parts of the y register are formed, and in the fourth line, the two products are added, with the lower order product, p1, shifted right by 15. With bit 40 cleared, the shift is an ordinary right shift by 15 bits, with the 0 bit of the a0 data being unchanged.

The second example shows a 16×31 multiply using GSM-EFR or G.729:

$$auc0 = AUC\_DEFAULT + AUC\_SHFT15 \quad /* \; SHFT15 = 1 */$$
$$a0 = 0 \quad p0 = 0 \quad\quad p1 = 0 \quad\quad y = *r0++ \quad xh = *pt0++$$
$$p0 = xh*yh \quad p1 = xh*yl$$
$$a0 = a0 + p0 + p1 >> 15 \quad /* \; \text{This is "p1 >> 16 << 1" not "p1 >> 15"} */$$

In the first line, the SHFT15 mode bit 40 is set to 1. The remainder of the code is the same, except mode bit 40 now causes the 0 bit of the a0 data to be cleared, simulating a >>16<<1 shift.

It is clear that the same instructions are used for GSM-HR, GSM-EFR and G.729 extended precision multiplies. Thus, the invention described herein saves valuable instruction space, yet provides the flexibility to support multiple coding standards. Moreover, the relative simplicity of this design allows it to be implemented using less circuitry than some prior methods.

Figure 4:
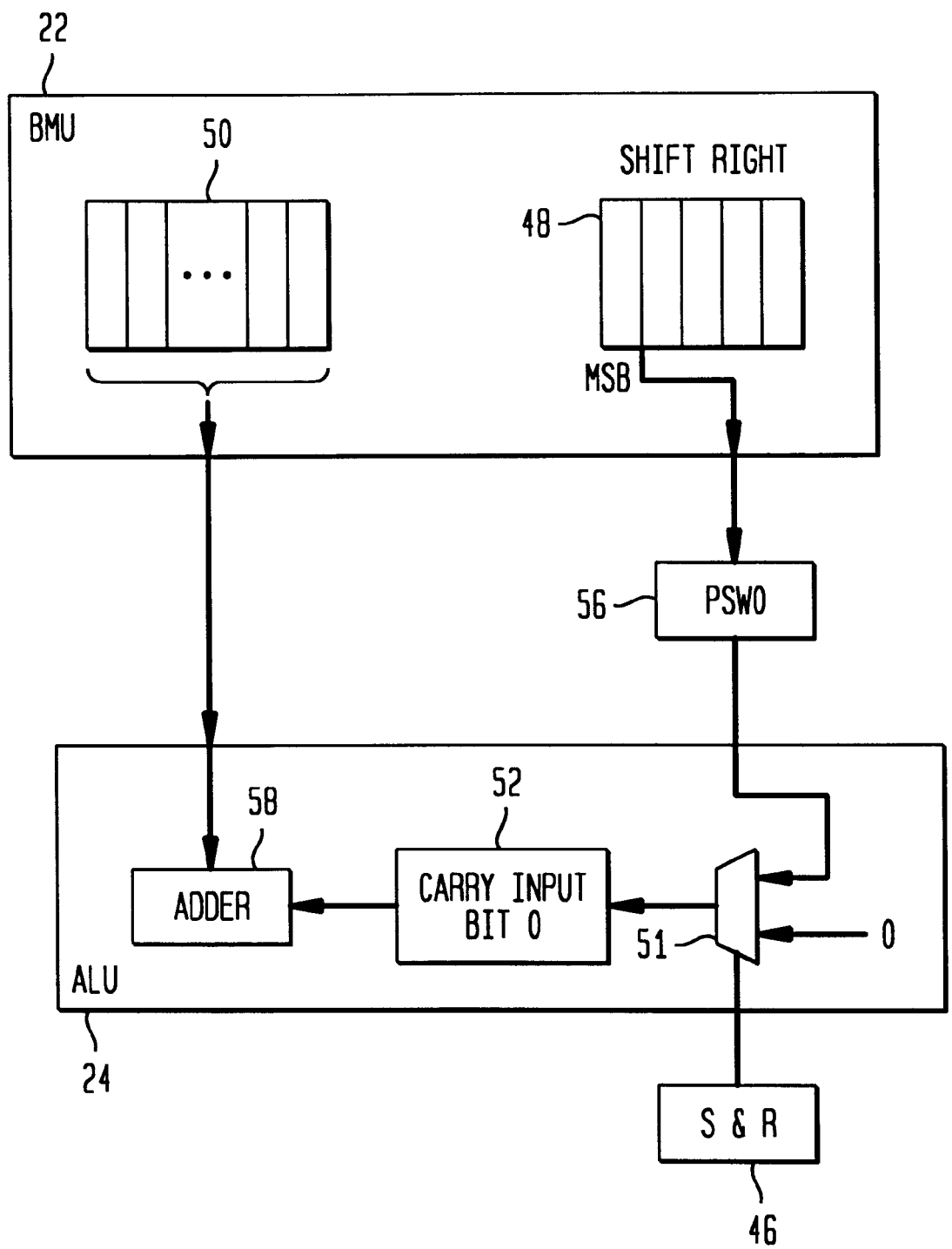
FIG. 4 is a block diagram illustrating one embodiment of an implementation of a shift-and-round operation according to the present invention.

FIG. 4 illustrates another embodiment of the invention that is directed to a shift-and-round operation. An S&R bit 46 defined, for example, in the auc0 register 26 (FIG. 1) specifies whether the most significant bit ("MSB") 48 of the bits shifted out of a data word 50 is routed to the carry input of bit 0 (52) of the subsequent adder. When the adder 58 is doing an add operation, a multiplexer 51 selects either a "0" (S & R bit 46 not set) or the MSB 48 (S & R bit 46 set) as the input to the carry input bit 0 52. When the adder 58 is doing a subtract operation, the multiplexer does a similar operation as above with additional bit manipulation of the least significant bits of the data word being subtracted. This bit manipulation will depend on the type of subtraction (e.g., two's complement, etc.) performed by the adder 58.

The embodiment of FIG. 4 is realized in the DAU, D, of FIG. 1. The shift operation is performed by the BMU 22. The shifted out bit is stored temporarily in a register such as the PSW0 56. This bit is used in a subsequent adder operation performed by the adder circuit 58 in the ALU 24.

In practice, the shift-and-round mode my yield better numerical performance for certain DSP computations such as Fast Fourier Transform operations.

From the above, it may be seen that the disclosed invention provides an effective system and method for supporting multiple coding standards. While certain specific embodiments of the invention are disclosed as typical, the invention is not limited to these particular forms, but rather is applicable broadly to all such variations as fall within the scope of the appended claims.

Many modifications and adaptations will occur to those skilled in the art to which the invention pertains. For example, various architectures, data processing components, data memory components and programming languages may be used in practicing the claimed invention. Thus, the specific structures and methods discussed in detail above are merely illustrative of a few specific embodiments of the invention.

What is claimed:

1. A method of manipulating signal information to support multiple coding standards, the method comprising the steps of:
    defining mode information in a data memory;
    setting the mode information to specify a type of data bit shift operation from a plurality of types of data bit shift operations to support the multiple coding standards;
    receiving the signal information; and
    performing a type of shift operation on the signal information according to the mode information such that the multiple coding standards are supported.

2. The method of claim 1, wherein the types of shift operations comprise shifting a data word of the signal information a predetermined number of bits in a predetermined direction, and the mode information specifies whether a least significant bit of the data word is cleared.

3. The method of claim 2, further comprising the step of:
    defining the predetermined direction to be a shift to the right.

4. The method of claim 3, further comprising the step of:
    defining the predetermined number of bits to be fifteen.

5. The method of claim 1, wherein the types of shift operations comprise a shift fifteen right operation, and a shift sixteen right and shift one left operation.

6. The method of claim 5, wherein the performing step comprises:
    causing an effective shift of a data word of the signal information fifteen bits to the right, and
    selectively clearing a least significant bit of the data word when the data word is shifted.

7. The method of claim 1, wherein the mode information causes the shift operation to be compatible with at least one of a plurality of coding standards.

8. The method of claim 1, wherein the mode information specifies a shift operation that is compatible with GSM-HR.

9. The method of claim 8, wherein the shift operation comprises a right shift of fifteen bits.

10. The method of claim 1, wherein the mode information specifies a shift operation that is compatible with GSM-EFR.

11. The method of claim 10, wherein the shift operation comprises a right shift of fifteen bits.

12. The method of claim 1, wherein at least one of the types of shift operations comprises a shift and round operation.

13. The method of claim 12, wherein the mode information specifies whether a most significant bit shifted out of a data word of the signal information is routed to a carry bit of a subsequent adder operation.

14. The method of claim 13, further comprising the step of:
    routing a shifted bit to a carry bit of subsequent adder operation.

15. The method of claim 1, further comprising the step of:
    digitizing the signal information.

16. A data arithmetic unit for manipulating signal information to support multiple coding standards comprising:
    a data memory for storing mode information, the mode information specifying types of shift operations;
    a data shifter for accomplishing bit-wise shifts of a data word; and
    means, responsive to the mode information stored in the data memory, for controlling shift operations performed by the data shifter such that multiple coding standards are supported.

17. The data arithmetic unit of claim 16, wherein the means for controlling selectively clears a least significant bit of the data word according to the mode information.

18. The data arithmetic unit of claim 16, wherein the data shifter comprises a multiplexer for selecting data associated with either shifted bits or unshifted bits.

19. The data arithmetic unit of claim 16, further comprising:
    an adder,
    wherein the means for controlling selectively routes a most significant bit shifted out of the data word to a carry bit of the adder according to the mode information.

20. A digital signal processing method for manipulating signal information to support multiple coding standards, the method comprising the steps of:
    associating a plurality of mode settings with a plurality of coding standards;
    defining a plurality of mode variables in a data memory;
    assigning a mode setting to a mode variable to specify a coding standard;
    receiving the signal information;
    defining a portion of the signal information in a data word; and
    performing a shift operation on the data word according to the assigned mode setting such that multiple coding standards are supported.

21. The method of claim 20, wherein the shift operation comprises shifting a data word of the signal information a predetermined number of bits in a predetermined direction and the mode setting specifies whether a least significant bit of the data word is cleared when the data word is shifted.

22. The method of claim 21, further comprising the step of:

defining the predetermined direction to be a shift to the right.

23. The method of claim 22, further comprising the step of:

defining the predetermined number of bits to be fifteen.

24. The method of claim 20, wherein the mode setting specifies a shift operation selected from the group consisting of a shift fifteen right operation and a shift sixteen right and shift one left operation.

25. The method of claim 20, wherein the coding standards include GSM-HR.

26. The method of claim 20, wherein the coding standards include GSM-EFR.

27. A digital signal processing method for manipulating signal information to support multiple coding standards, the method comprising the steps of:

associating a plurality of mode settings with a plurality of computational operations;

defining a plurality of mode variables in a data memory;

assigning a mode setting to a mode variable to specify a computational operation;

receiving the signal information;

defining a portion of the signal information in a data word;

performing a shift operation on the data word; and routing the shifted data word to an adder operation.

28. The method of claim 27, further comprising the step of:

routing a most significant bit shifted out of the data word to a carry bit of the adder operation according to the assigned mode setting.

* * * * *

UNITED STATES PATENT AND TRADEMARK OFFICE
CERTIFICATE OF CORRECTION

PATENT NO.    : 6,209,012 B1                                           Page 1 of 1
DATED         : March 27, 2001
INVENTOR(S)   : Kurt Baudendistel It is certified that error appears in the above-identified patent and that said Letters Patent is hereby corrected as shown below:

<u>Title page,</u>
Item [73] Assignee, change, "Murray Hill, New York" to -- Murray Hill New Jersey --.

Signed and Sealed this

Fourteenth Day of May, 2002

*Attest:*

*Attesting Officer*

JAMES E. ROGAN
*Director of the United States Patent and Trademark Office*